US 6,548,101 B2

(12) United States Patent
Cevallos et al.

(10) Patent No.: US 6,548,101 B2
(45) Date of Patent: Apr. 15, 2003

(54) WHITENED COFFEE CONCENTRATE

(75) Inventors: Agustin Cevallos, Niederwichtrach (CH); Oliver Chmiel, Orbe (CH); Daniela Doris Munz-Schaerer, Konolfingen (CH); Stefan Bodenstab, Mannens (CH); Cristin Knoblich, Konolfingen (CH); Martinas Kuslys, Grosshoechstetten (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/187,837

(22) Filed: Jul. 3, 2002

(65) Prior Publication Data

US 2002/0192351 A1 Dec. 19, 2002

Related U.S. Application Data

(62) Division of application No. 09/558,064, filed on Apr. 26, 2000, now Pat. No. 6,447,830.

(30) Foreign Application Priority Data

Apr. 26, 1999 (EP) ............................................. 99108164

(51) Int. Cl.$^7$ .................................................. A23F 5/00
(52) U.S. Cl. ........................ 426/594; 426/580; 426/584
(58) Field of Search ................................. 426/594, 580, 426/584

(56) References Cited

U.S. PATENT DOCUMENTS

| | | | |
|---|---|---|---|
| 2,340,989 A | 2/1944 | Salkin | 99/71 |
| 2,801,920 A | 8/1957 | Reich et al. | 99/71 |
| 3,823,241 A | 7/1974 | Patel et al. | 426/386 |
| 4,983,408 A | 1/1991 | Colton | 426/45 |
| 5,030,473 A | 7/1991 | Ghodsizadeh | 426/650 |
| 5,222,364 A | 6/1993 | Carns et al. | 62/15 |
| 5,620,733 A | 4/1997 | Chaveron et al. | 426/580 |
| 5,882,716 A * | 3/1999 | Munz-Schaerer et al. | |
| 6,447,830 B1 * | 9/2002 | Cevallos et al. | |

FOREIGN PATENT DOCUMENTS

| | | |
|---|---|---|
| CH | 255956 | 7/1948 |
| EP | 0 885 566 A1 | 12/1998 |
| EP | 0 893 065 A2 | 1/1999 |
| FR | 2 610 174 | 8/1988 |
| GB | 1130129 | 10/1968 |
| GB | 1415844 | 11/1975 |
| WO | WO 89/04282 | 5/1989 |

OTHER PUBLICATIONS

G. Ehlers, "Possible applications of enzymes in coffee processing" Chemical Abstracts, Columbus, Ohio, vol. 96, No. 10, (1982).

* cited by examiner

Primary Examiner—Anthony J. Weier
(74) Attorney, Agent, or Firm—Winston & Strawn

(57) ABSTRACT

A stable, whitened coffee concentrate that is a mixture of milk solids, soluble coffee solids, and coffee aroma, that has a solids concentration above about 25% by weight and a process for making the concentrate. The coffee aroma stabilizes the concentrate.

20 Claims, No Drawings

WHITENED COFFEE CONCENTRATE

CROSS-REFERENCE TO RELATED APPLICATIONS

This application is a divisional of application Ser. No. 09/558,064, filed Apr. 26, 2000, now U.S. Pat. No. 6,447,830. The entire contents of the prior application is hereby incorporated herein by express reference thereto.

FIELD OF THE INVENTION

The invention relates to a stable, whitened coffee concentrate and a process for producing the concentrate. The invention also relates to a method for stabilizing whitened coffee concentrates.

BACKGROUND

Coffee products that contain mixtures of soluble coffee solids and milk solids are commonly found in two forms; as soluble beverage powders or as ready-to-drink liquid beverages. Although these products appear to be simple, numerous difficulties need to be overcome in order to produce them. For example, the inherent instability of coffee and milk mixtures creates a significant problem that needs to be overcome.

For soluble beverage powders, a common problem is the appearance of flocculated milk proteins when the beverage is reconstituted with water. The flocculated milk proteins negatively affect consumer acceptability. The problem of flocculation of the milk proteins in coffee beverages has been satisfactorily dealt with by a process in which the milk proteins are subjected to a processing step that controls flocculation. After processing in this way, any flocculated milk proteins in the reconstituted beverage are too small to be visible. This process is described in U.S. Pat. No. 5,620,733.

For ready-to-drink liquid beverages, in addition to the problems with flocculation of milk proteins, it is found that lipids in the beverage rise to the surface of the beverage in the form of globules. These globules form an agglomerated, white layer known as a cream layer and the phenomenon is known as creaming. Upon shaking of the container, the globules usually re-disperse within the beverage, however, a persistent, visible white ring usually remains on the container at the interface between the liquid beverage and the gas above it. The presence of this ring is unacceptable to consumers. Processing techniques and stabilizers are necessary to deal with the problem.

The stability problems become even more pronounced when whitened coffee products are formulated into a liquid concentrate. Typically, the coffee component of these concentrates develops increased acidity over time. The increased acidity negatively influences the taste of products reconstituted from the concentrate. Furthermore, the increase in acidity leads to other problems such as curdling of the milk component, gelation, and sedimentation. Therefore, despite the advantages offered by whitened coffee concentrates they are not commercially available, since the consuming public will not accept products that exhibit the above-identified problems. Thus, there is a need for a stable, whitened coffee concentrate that avoids the above-identified problems.

SUMMARY OF THE INVENTION

The present invention relates to a stable, whitened coffee concentrate; a method for stabilizing a whitened coffee concentrate; and a method for making the stable, whitened coffee concentrate. The stable, whitened coffee concentrate includes concentrated milk components, concentrated soluble coffee solids, and coffee aroma, wherein the solids concentration of the whitened coffee concentrate is above about 25% by weight. The ratio, on a dry basis, of non-fat milk solids to coffee solids may be between about 1:0.1 and 1:0.7. The concentrate shows substantially no change in viscosity after at least 5 months storage at room temperature.

The coffee aroma may provided in the form of an aromatized coffee concentrate. Preferably, the aromatized coffee concentrate has a total organic content (TOC) of above about 300 mg/100 g of aromatized coffee concentrate and more preferably a TOC of above about 450 mg/100 g of aromatized coffee concentrate. Preferably, the coffee aroma also includes highly volatile aroma components.

The concentrate may include between about 50% and 60% sugar, between about 15% and 25% non fat milk solids, between about 8% and 15% soluble coffee solids, and between about 8% and 15% milk fat, the percentages being on the basis of dry weight. Preferably, the solids concentration is between about 70% and 80% by weight. Preferably, the concentrated soluble coffee solids are enzymatically hydrolyzed. The concentrate may also include one or more additives such as buffers, sweeteners, flavorings, colorings, emulsifiers or mixtures thereof. The concentrate may be packaged in a single-serve sachet.

The method of stabilizing the whitened coffee concentrate involves adding to a whitened coffee concentrate a sufficient amount of coffee aroma to stabilize the coffee concentrate and provide a stable, whitened coffee concentrate having a solids concentration above about 25% by weight. Preferably, the amount of coffee aroma is between about 1 and 3 percent by weight and contains highly volatile aroma components.

The stable, whitened coffee concentrate is prepared by combining concentrated coffee solids with concentrated milk components to provide a whitened coffee concentrate; adding to the whitened coffee concentrate a sufficient amount of coffee aroma to stabilize the whitened coffee concentrate and provide a stable, whitened coffee concentrate having a solids content of above about 25% by weight; homogenizing the stable, whitened coffee concentrate to increase the dispersion of fat in the stable, whitened coffee concentrate; and packaging the homogenized stable whitened coffee concentrate.

The amount of coffee aroma may be from about 1 and 3 percent by weight. Preferably, the coffee aroma contains highly volatile aroma components. In addition, one or more additives such as buffers, sweeteners, flavorings, colorings, emulsifiers or mixtures thereof may be added to the stable, whitened coffee concentrate. The whitened coffee concentrate may be subjected to colloidal milling.

DETAILED DESCRIPTION OF THE PREFERRED EMBODIMENTS

The invention provides a stable, whitened coffee concentrate that can be stored under shelf conditions for long periods of time without significant stability and flavor-degradation problems. For example, the concentrate may be stored for more than about 5 months, preferably more than about 9 months, and more preferably more than about 12 months without significant stability and flavor-degradation problems. The stable, whitened coffee concentrate does not exhibit a harsh acidity after storage and exhibits a reduced tendency to undergo gelation and sedimentation during storage. By gelation is meant an increase in viscosity of the concentrate over time. By sedimentation is meant the formation of a solid that precipitates from the concentrate and settles to the bottom of the container in which the concentrate is packaged.

The whitened coffee concentrate comprises a mixture of concentrated milk components, concentrated soluble coffee solids, and a stabilizing amount of a coffee aroma. The whitened coffee concentrate has a solids concentration above about 25 percent by weight, preferably between about 30 and 75 percent and more preferably between about 55 and 72 percent.

The concentrated soluble coffee solids may be provided in the form of a soluble powder or suitable base coffee concentrate. By coffee concentrate is meant a concentrated extract of roast coffee. The base coffee concentrate may be prepared by one of two methods. In the first method, soluble coffee powder is dissolved in water to provide a base concentrate with the desired concentration of coffee solids. In the second method, a coffee extract is obtained by a coffee extraction process and the resulting extract is concentrated to the desired concentration of coffee solids. The coffee extract may be obtained by extracting roasted coffee beans with a solvent. Methods for extracting roasted coffee beans and for concentrating the resulting extract are well known to those of ordinary skill in the art. Any suitable extraction procedure or concentration procedure may be used. The choice and design of the extraction procedure and concentration procedure is a matter of preference and has no critical impact on the invention.

Optionally, the concentrated coffee solids may be subjected to enzymatic hydrolysis; for example using a gamanase. Hydrolysis using a gamanase offers the advantage of increased stability and a further reduction in sedimentation.

The concentrated milk components may be provided in the form of a powdered milk or a suitable milk concentrate. The milk concentrate may be prepared by any means available to those of ordinary skill in the art. For example, the milk concentrate may be prepared by the procedure commonly used to produced condensed milk. Alternatively, the milk concentrate may be prepared by concentrating milk, for example, by evaporation. The solution of milk concentrate, having the selected solids content, may also be prepared by combining skimmed milk solids, milk fat, and sugar with water. Optionally, additional milk protein sources such as whey or casein may be added. If a milk concentrate is used, the milk concentrate preferably has a milk solids content above about 30% by weight. Preferably, the milk concentrate has a solids concentration of between about 50% by weight and 85% by weight. The final product, i.e., the whitened coffee concentrate, preferably has between about 15 percent and 25 percent of skimmed milk powder and between about 5 percent and 15 percent of milk fat.

Coffee aroma are the volatile components of coffee that produce the characteristic fragrance of coffee. The coffee aroma is conveniently provided in the form of a highly aromatized coffee concentrate. The aromatized coffee concentrate is prepared by adding coffee aroma to a coffee concentrate. Methods of preparing coffee concentrates are well known to those of ordinary skill in the art. The coffee aroma is in the form of natural coffee aroma components that are collected during the preparation of soluble coffee powder. This may be done by standard procedures for collecting coffee aroma components or by suitably modifying the standard procedures.

Preferably, the natural coffee aroma includes highly volatile aroma components. Highly volatile aroma components are those which condense at a temperature below about 0° C. To recover highly volatile aroma components, the standard procedure usually entails flushing volatile aroma components from the coffee during processing using an inert carrier gas such as nitrogen. The aroma-laden carrier gas is then chilled to temperatures lower than about −40° C., and sometimes as low as about −195° C., to cause the aroma components to condense. The condensed aroma components are then collected. Suitable procedures for capturing coffee aroma are disclosed in, for example, U.S. Pat. Nos. 3,823,241, 5,030,473, and 5,222,364, the disclosures of which are expressly incorporated herein by reference.

Sufficient coffee aroma is added to the coffee concentrate to provide a total organic concentration (TOC) of above about 300 mg/100 g of aromatized concentrate. Preferably, the aromatized concentrate has a TOC above about 350 mg/100 g, and more preferably above about 450 mg/100 g of aromatized concentrate. The aromatized coffee concentrate preferably has a solids concentration of between about 35 and 75 percent by weight, more preferably between about 35 and 45 percent by weight. Preferably, the coffee aroma is added in an amount of between about 1 and 3 percent by weight of the whitened coffee concentrate.

Unexpectedly, the coffee aroma stabilizes the whitened coffee concentrate. It is surprising that coffee aroma stabilizes the whitened coffee concentrate since coffee aroma is ordinarily more unstable than either milk concentrate or coffee concentrate.

The stable, whitened coffee concentrate may be produced from the concentrated milk components, concentrated coffee components, and coffee aroma in several ways. The ingredients may be combined in any order. For example, the concentrated coffee components and the coffee aroma may be combined to form a mixture and the concentrated milk components then added to the mixture as a powder. Alternatively, the mixture may be added to the concentrated milk components in the form of a milk concentrate. As a further alternative, the concentrated milk components, concentrated coffee components, and coffee aroma are combined together in one step. Suitable mixers may be used to combine the ingredients.

The ratio, on a dry basis, of milk solids to coffee solids in the whitened coffee concentrate of the invention is typically less than about 1:0.7, preferably between about 1:0.2 and 1:0.6.

Additional ingredients may also be incorporated into the whitened coffee concentrate as desired. Examples of additional ingredients include, but are not limited to, buffers such as sodium and potassium bicarbonate, di-sodium and di-potassium phosphate, sodium and potassium citrates, and various combinations of these buffers; suitable sweeteners such as maltodextrin, saccharin, cyclamates, acetosulfame, sucralose, L-aspartyl based sweeteners such as aspartame, and mixtures of these sweeteners; suitable flavors such as vanilla, bourbon, whisky, chocolate, and the like; artificial or natural colorings; suitable emulsifiers such as mono- and di-esters of glycerol and a fatty acid, glycerol monostearates, sorbitol monostearates, esters or carbocyclic acids with mono-and di-glycerides, monosodium phosphate derivatives of mono- and di-glycerides, lecithin, diacetyl tartaric acid esters of mono-diglycerides (data esters), sorbitan esters, diacetyl tartaric acids esters of mono- and di-glycerides, succinylated mono- and diglycerides, acetylated mono- and di-glycerides, hydroxylated lecithin, propylene glycol mono- and di-esters of fatty acids, polyglycerol esters of fatty acids, lactylic esters of fatty acids, and mixtures of these emulsifiers.

The solids content of the whitened coffee concentrate is more than about 25%. In one embodiment the whitened coffee concentrate has a solids concentration between about 65% and 85% by weight, preferably between about 70% and 80% by weight. For example, the whitened coffee concentrate may have a solids concentration of between about 70% and 75% by weight. In another embodiment, the whitened coffee concentrate has a solids concentration of about 30% to about 35% by weight. If the whitened coffee concentrate does not have the desired solids concentration, the desired concentration may be obtained by combining the whitened coffee concentrate with another concentrate having a higher or lower solids content, as required, to standardize the solids concentration of the whitened coffee concentrate to the desired value.

The water activity, $a_w$, of the whitened coffee concentrate may be between about 0.80 and 0.95. The pH of the whitened coffee concentrate may be between about 5 and 8, preferably between about 6 and 7, and most preferably about 6.5.

After the ingredients are combined the whitened coffee concentrate may optionally be subjected to colloidal milling. Colloid milling reduces viscosity and sedimentation in the final product. Ordinarily, colloidal milling is not necessary for whitened coffee concentrates having a solids concentration of less than about 50% by weight. Preferably the colloidal milling occurs at elevated temperatures, for example from between about 100° C. and 150° C. The time for which the whitened coffee concentrate is subjected to colloidal milling may be selected as desired, preferably the concentrate is subjected to colloidal milling for a period of time between about 1 minute and 20 minutes.

If the whitened coffee concentrate is to be aseptically filled into containers, it is preferably heat treated at this stage of the process to sterilize the product. For example, the whitened coffee concentrate may be subjected to ultra high temperature (UHT) treatment at a temperature above about 115° C. Preferably the temperature is between about 120° C. and 150° C., more preferably between about 120° C. and 155° C. Typically, the mixture is held at the raised temperature for less than about 5 minutes, preferably for between about 1 and 5 minutes. Preferably, the mixture is held at the raised temperature for sufficient time to provide a $F_0$ value of at least about 4.

Whether heat treated or not, the whitened coffee concentrate may then be subjected to homogenization to increase the dispersion of fat in the whitened coffee and provide a more uniform product. Homogenization is preferably carried out in two stages. For example, for whitened coffee concentrates that have been subjected to colloidal milling, homogenization may be carried out in a first stage at a pressure of between about 5 Mpa and 25 MPa followed by a second stage at a pressure of between about 1 MPa and 5 MPa. For whitened coffee concentrates which have not been subjected to colloidal milling, homogenization may be carried out in a first stage at a pressure of between about 15 Mpa and 30 MPa followed by a second stage at a pressure of between about 3 MPa and 10 Mpa. All processing steps are performed under conditions wherein loss of the coffee aroma from the whitened coffee concentrate is minimized.

The whitened coffee concentrate is then filled into suitable containers, with or without thermal treatment prior to filling. In one embodiment, the whitened coffee concentrate is heated to a temperature of between about 80° C. and 100° C. for a period of less than about 1 minute and then hot filled into suitable containers. In another embodiment, the whitened coffee concentrate is aseptically filled into suitable containers. In another embodiment, the whitened coffee concentrate is filled into suitable containers and then retorted. In yet another embodiment, the whitened coffee concentrate is frozen and then filled into a suitable container.

Containers suitable for containing the whitened coffee concentrate of the invention can be flexible, semi-rigid or rigid depending upon the process conditions and the type of product desired. Suitable containers include, but are not limited to, stick packs; sachets; carton-based; tetrahedron packs (closeable or not); unifill packs; squeezeable plastic bottles; stand up pouches; plastic cups; and the like. The containers should be such that they provide a barrier to minimize exposure of the whitened coffee concentrate to water vapor, oxygen, and light transmission. A sufficiently high barrier can be obtained, for example, with a container made of a film that contains polyester/aluminum/polyethylene layers.

In one embodiment the whitened coffee concentrate is packaged in single serving containers. For single serving containers, the container is suitably a sachet or stick pack. By stick pack is meant a long, narrow sachet. Equipment and material for producing these containers are commercially available. Vertical form fill and seal machines may be used. Conveniently, the sachet or stick pack has a tear off section which may be provided in the usual manner by a notch, fancy cut, or laser cut. Presenting the whitened coffee concentrate in this form offers the advantage that the whitened coffee concentrate may be provided in a convenient, single serving pack. The consumer then need only open the pack, pour or squeeze the concentrate into a cup, and add water. Typically, the stick pack contains between about 20 g and 50 g of the concentrate.

Beverages produced from the whitened coffee concentrate have a good aroma and flavor profile without harsh acidity. In addition, the whitened coffee concentrate of the invention has good stability and may be stored for extended periods at room temperature.

EXAMPLES

The invention is further defined by reference to the following examples describing in detail the preparation of the stable, whitened coffee concentrate of the invention. The examples are representative, and they should not be construed to limit the scope of the invention in any way.

Example 1

A coffee aroma is collected from freshly ground coffee and cryogenically condensed as described in U.S. Pat. No. 5,222,364. In addition, an aqueous aroma distillate was obtained by steam stripping a coffee extract in a conventional manner. The condensed aroma and the aqueous aroma distillate were then mixed into a coffee concentrate that had a coffee solids concentration of about 50% by weight. The resulting aromatized coffee concentrate has a solids concentration of about 39% by weight and a TOC of about 382 mg/100 g of coffee concentrate.

A base coffee concentrate was prepared by dissolving soluble coffee solids in water. The base coffee concentrate had a solids concentration of between about 25% and 30% by weight. The base coffee concentrate and the aromatized coffee concentrate were then combined in a mixer in a weight ratio of 5:1. The resulting coffee concentrate had a solids concentration of between about 25% and 30% by weight.

A milk concentrate containing about 22% by dry weight of skimmed milk solids, about 12% by dry weight of butter fat, and about 66% by dry weight of sugar was then added to the coffee concentrate in a mixer to provide a whitened coffee concentrate. The ratio of non-fat milk solids to coffee solids in the whitened coffee concentrate was about 1:0.58. A small amount of disodium phosphate, about 0.4% by dry weight, was included in the whitened coffee concentrate. The whitened coffee concentrate was standardized to a solids content of about 72% by weight, a water activity of about 0.83, and a pH of about 6.5.

The whitened coffee concentrate was then subjected to colloidal milling. The milled concentrate was then homogenized in two stages. Homogenization was carried out in the first stage at a pressure of about 10 MPa followed by a second stage at a pressure of about 3 MPa. The homogenized concentrate was then heated to about 93° C. for about 45 seconds by direct injection of steam. The hot concentrate was then filled into stick packs. Each stick pack containing about 20 g of whitened coffee concentrate. A vertical form fill and seal machine was used to fill the stick packs. The stick packs were made from a polyester/aluminum/polyethylene film. The stick packs had a tear off section provided by a laser cut.

The stick pack were opened and the contents squeezed into a cup. About 150 ml of hot water was added and the mixture stirred. Reconstitution was instantaneous. A whitened coffee beverage was obtained. No milk flocculation was noticed and no lumps or other undissolved material could be detected. The beverage was tasted and found to have a smooth coffee taste; no noticeable harshness or and acidity; and a well defined, rich coffee aroma. The beverage had an excellent mouthfeel with no sandiness or dust-like texture.

Example 2

The process of example 1 was repeated except that no coffee aroma was incorporated into the whitened coffee concentrate. The stick packs with no coffee aroma were labeled as group A. The stick packs of example 1 were labeled as group 1. All stick packs were stored at 20° C. A sample from each group was opened after 1 month and each month thereafter for a total storage time of 5 months. The viscosity and the sedimentation of each concentrate was determined. The results are provided in the Table I:

TABLE I

| Group | Time (months) | Viscosity (mPa/s) | Sedimentation (mm) |
|-------|---------------|-------------------|--------------------|
| A     | 1             | 2800              | 0.4                |
|       | 2             | 3100              | 1.9                |
|       | 3             | 4800              | 2.9                |
|       | 4             | 5700              | 3.9                |
|       | 5             | ND                | 7.0                |
| 1     | 1             | 2.000             | 0.4                |
|       | 2             | 1600              | 0.4                |
|       | 3             | 1800              | 1.9                |
|       | 4             | 2000              | 1.9                |
|       | 5             | 2000              | 1.9                |

The results indicate that the whitened coffee concentrate which contained the coffee aroma has superior stability. The viscosity of the whitened coffee concentrate remained substantially constant indicating that the samples did not undergo gelation. Furthermore, sedimentation was much less in the whitened coffee concentrate which contained the coffee aroma.

Example 3

The process of example 1 was repeated except that base coffee concentrate was subjected to enzymatic hydrolysis using 1.5 L gamanase prior to the addition of the coffee aroma. Stick packs containing the whitened coffee concentrate were stored for a period of up to 9 months. After 1–3 months, stability problems such as creaming, coagulation, sedimentation, and gelation begin to reach unacceptable levels in the samples of the whitened coffee concentrate that contained coffee solids that had not been hydrolyzed with gamanase or did not contain coffee aroma. In contrast, the whitened coffee concentrate that contained coffee solids that had been hydrolyzed with gamanase did not show stability problems until after about 9 months.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for stabilizing a whitened coffee concentrate comprising adding to a whitened coffee concentrate a sufficient amount of coffee aroma to stabilize the coffee concentrate and provide a stable whitened coffee concentrate having a solids concentration above about 25% by weight.

2. The method of claim 1, wherein the amount of coffee aroma is from about 1 to 3 percent by weight of whitened coffee concentrate.

3. The method of claim 1, wherein the coffee aroma contains highly volatile aroma components.

4. The method of claim 1, wherein the coffee aroma is provided in the form of an aromatized coffee concentrate.

5. The method of claim 4, wherein the aromatized coffee concentrate has a total organic content (TOC) of above about 300 mg/100 g of aromatized coffee concentrate.

6. The method of claim 4 wherein the aromatized coffee concentrate has a total organic content (TOC) of above about 450 mg/100 g of aromatized coffee concentrate.

7. The method of claim 1, further comprising subjecting the whitened coffee concentrate to colloidal milling.

8. The method of claim 1 wherein the ratio of non-fat milk solids of the concentrated milk component to the coffee solids is from about 1:0.1 to 1:0.7.

9. The method of claim 1, further comprising enzymatically hydrolyzing the solids.

10. The method of claim 1, wherein the concentrate comprises from about 50% and 60% sugar, from about 15% and 25% non fat milk solids, from about 8% and 15% soluble coffee solids, and from about 8% and 15% milk fat, the percentages being on the basis of dry weight.

11. A process for preparing a stable whitened coffee concentrate, the method comprising:
   combining concentrated coffee solids with concentrated milk components to provide a whitened coffee concentrate;
   adding to the whitened coffee concentrate a sufficient amount of coffee aroma to stabilize the whitened coffee concentrate and provide a stable whitened coffee concentrate having a solids content of above about 25% by weight;
   homogenizing the stable whitened coffee concentrate to increase the dispersion of fat in the stable whitened coffee concentrate; and
   packaging the homogenized stable whitened coffee concentrate.

12. The method of claim 11, wherein the amount of coffee aroma is from about 1 to 3 percent by weight of whitened coffee concentrate.

13. The method of claim 11, wherein the coffee aroma contains highly volatile aroma components.

14. The method of claim 11, wherein the coffee aroma is provided in the form of an aromatized coffee concentrate.

15. The method of claim 14, wherein the aromatized coffee concentrate has a total organic content (TOC) of above about 300 mg/100 g of aromatized coffee concentrate.

16. The method of claim 14 wherein the aromatized coffee concentrate has a total organic content (TOC) of above about 450 mg/100 g of aromatized coffee concentrate.

17. The method of claim 1, further comprising enzymatically hydrolyzing the solids.

18. The method of claim 11, further comprising adding one or more additives selected from the group consisting of buffers, sweeteners, flavorings, colorings, emulsifiers, and mixtures thereof.

19. The method of claim 11, wherein the ratio of non-fat milk solids of the concentrated milk component to the coffee solids is from about 1:0.1 to 1:0.7.

20. The method of claim 11, further comprising subjecting the whitened coffee concentrate to colloidal milling.

* * * * *